(12) United States Patent
Nicol et al.

(10) Patent No.: US 7,585,449 B2
(45) Date of Patent: Sep. 8, 2009

(54) SENSORY SYSTEM AND METHOD THEREOF

(76) Inventors: William A. Nicol, 868 S. Calle Venado, Anaheim, CA (US) 92807; Edward Kachnic, 4026 Hickory Nut Dr., Douglasville, GA (US) 30135; Benjamin Pryhoda, 530 Arbor Dr., Lafayette, CO (US) 80026

( * ) Notice: Subject to any disclaimer, the term of this patent is extended or adjusted under 35 U.S.C. 154(b) by 0 days.

(21) Appl. No.: 10/580,382

(22) PCT Filed: Nov. 19, 2004

(86) PCT No.: PCT/US2004/038939

§ 371 (c)(1),
(2), (4) Date: Feb. 12, 2007

(87) PCT Pub. No.: WO2005/052525

PCT Pub. Date: Jun. 9, 2005

(65) Prior Publication Data

US 2008/0038395 A1 Feb. 14, 2008

Related U.S. Application Data

(60) Provisional application No. 60/523,779, filed on Nov. 20, 2003.

(51) Int. Cl.
*B29C 45/78* (2006.01)
*B29C 47/92* (2006.01)

(52) U.S. Cl. .................. 264/334; 264/40.1; 264/410

(58) Field of Classification Search ................. 425/135, 425/169, 170, 171; 264/40.1, 410, 334
See application file for complete search history.

(56) References Cited

U.S. PATENT DOCUMENTS

| 3,303,537 | A | 2/1967 | Mislan |
| 3,642,401 | A | 2/1972 | Wilson |
| 4,236,181 | A | 11/1980 | Shibata et al. |
| 4,358,186 | A | 11/1982 | Johnson et al. |
| 4,603,329 | A | 7/1986 | Bangerter et al. |
| 4,806,292 | A | 2/1989 | DeLacy |
| 4,841,364 | A | 6/1989 | Kosaka et al. |

(Continued)

FOREIGN PATENT DOCUMENTS

DE 19909307 A1 7/1998

(Continued)

OTHER PUBLICATIONS

Abbott et al., "*Elimination of Process Constraints In Plastics Injection Molding*", International Polymer Processing, 1999, 13(3); p. 249-255.

*Primary Examiner*—Yodendra Gupta
*Assistant Examiner*—Emmanuel S Luk
(74) *Attorney, Agent, or Firm*—Joel D. Myers; Sandra M. Sovinski

(57) ABSTRACT

A sensory system and method for optimizing the cycle time of a part-forming process, wherein the temperature status of a molded part is ascertained and utilized to enable minimization of mold close time.

6 Claims, 4 Drawing Sheets

U.S. PATENT DOCUMENTS

| | | | |
|---|---|---|---|
| 4,871,493 A | 10/1989 | Goto | |
| 4,933,126 A | 6/1990 | Shuman | |
| 5,062,052 A | 10/1991 | Sparer et al. | |
| 5,062,053 A | 10/1991 | Shirai et al. | |
| 5,095,252 A | 3/1992 | Kurth | |
| 5,115,136 A | 5/1992 | Tomasch | |
| 5,158,724 A | 10/1992 | Yagi et al. | |
| 5,223,191 A | 6/1993 | Tatsuno et al. | |
| 5,243,665 A | 9/1993 | Maney et al. | |
| 5,454,022 A | 9/1995 | Lee et al. | |
| 5,470,218 A | 11/1995 | Hillman et al. | |
| 5,514,309 A * | 5/1996 | Williamson et al. | 264/37.17 |
| 5,567,366 A | 10/1996 | Motegi et al. | |
| 5,591,385 A | 1/1997 | Arai et al. | |
| 5,768,138 A | 6/1998 | Ruotolo | |
| 5,795,511 A | 8/1998 | Kalantzis et al. | |
| 5,806,005 A | 9/1998 | Hull et al. | |
| 5,815,397 A | 9/1998 | Saito et al. | |
| 5,825,617 A | 10/1998 | Kochis et al. | |
| 5,878,153 A | 3/1999 | Mikulec et al. | |
| 5,891,383 A | 4/1999 | Joseph | |
| 5,898,591 A | 4/1999 | Hettinga et al. | |
| 5,928,578 A | 7/1999 | Kachnic et al. | |
| 5,940,139 A | 8/1999 | Smoot | |
| 5,978,578 A | 11/1999 | Azarya et al. | |
| 6,024,902 A | 2/2000 | Maus et al. | |
| 6,051,170 A | 4/2000 | Kamiguchi et al. | |
| 6,066,089 A | 5/2000 | Costello et al. | |
| 6,094,219 A | 7/2000 | Roberts et al. | |
| 6,192,257 B1 | 2/2001 | Ray | |
| 6,208,266 B1 | 3/2001 | Lyons et al. | |
| 6,221,189 B1 * | 4/2001 | Kieras et al. | 156/64 |
| 6,226,395 B1 | 5/2001 | Gilliland | |
| 6,232,583 B1 | 5/2001 | Uhm | |
| 6,233,626 B1 | 5/2001 | Swales et al. | |
| 6,258,303 B1 | 7/2001 | Hibi et al. | |
| 6,275,741 B1 | 8/2001 | Choi | |
| 6,356,192 B1 | 3/2002 | Menard et al. | |
| 6,362,875 B1 | 3/2002 | Burkley | |
| 6,369,873 B1 | 4/2002 | Levy et al. | |
| 6,396,949 B1 | 5/2002 | Nichani | |
| 6,400,398 B1 | 6/2002 | Chen | |
| 6,408,429 B1 | 6/2002 | Marrion, Jr. et al. | |
| 6,463,446 B1 | 10/2002 | Wollrath et al. | |
| 6,515,696 B1 | 2/2003 | Steinhauer et al. | |
| 6,592,354 B2 | 7/2003 | Kachnic et al. | |
| 6,592,355 B2 | 7/2003 | Kachnic | |
| 6,695,994 B2 | 2/2004 | Bulgrin et al. | |
| 2001/0034222 A1 | 10/2001 | Roustaei et al. | |
| 2002/0068106 A1 | 6/2002 | Kachnic et al. | |
| 2002/0089298 A1 | 7/2002 | Hatley et al. | |
| 2002/0102966 A1 | 8/2002 | Lev et al. | |
| 2002/0137567 A1 | 9/2002 | Cheng | |
| 2003/0007690 A1 | 1/2003 | Rajagopal et al. | |
| 2003/0065420 A1 | 4/2003 | Kachnic et al. | |
| 2003/0194460 A1 * | 10/2003 | Watanabe et al. | 425/137 |
| 2003/0195649 A1 | 10/2003 | Wunder | |
| 2004/0093114 A1 | 5/2004 | Magario et al. | |
| 2004/0128020 A1 | 7/2004 | Fischbach | |

FOREIGN PATENT DOCUMENTS

| | | |
|---|---|---|
| DE | 20204359 U1 | 6/2002 |
| EP | 1128244 A2 | 8/2001 |
| WO | 01/98050 A1 | 12/2001 |

* cited by examiner

SENSORY SYSTEM AND METHOD THEREOF

PRIORITY CLAIM AND CROSS REFERENCES

The present patent cooperation treaty application claims the benefit of a U.S. provisional application entitled SENSORY SYSTEM AND METHOD THEREOF, filed Nov. 20, 2003, having assigned Ser. No. 60/523,779, which is a continuation-in-part application of pending non-provisional patent application Ser. No. 10/619,762, filed Jul. 15, 2003, entitled SENSORY INSPECTION SYSTEM AND METHOD THEREOF, which is a continuation-in-part of pending non-provisional patent application Ser. No. 10/452,698, filed Jun. 2, 2003, entitled WIRELESS IMAGE PROCESSING METHOD AND DEVICE THEREFOR, which is a continuation-in-part and, like the present application, claims the benefit of pending non-provisional patent application Ser. No. 09/644,389, filed Aug. 23, 2000, entitled PART-FORMING MACHINE CONTROLLER HAVING INTEGRATED SENSORY AND ELECTRONICS AND METHOD THEREOF, and Ser. No. 10/246,974, filed Sep. 19, 2002, abandoned entitled PART-FORMING MACHINE CONTROLLER HAVING INTEGRATED SENSORY AND ELECTRONICS AND METHOD THEREOF, which are non-provisional patent applications of provisional patent application Ser. No. 60/212,518, filed on Jun. 19, 2000, entitled PART-FORMING MACHINE CONTROLLER HAVING INTEGRATED SENSORY AND ELECTRONICS AND METHOD THEREOF; non-provisional patent application Ser. No. 09/728,241, filed Dec. 1, 2000, issued into U.S. Pat. No. 6,592,354 on Jul. 15, 2003, entitled PART FORMING MACHINE HAVING AN INFRARED VISION SYSTEM AND METHOD FOR VERIFYING THE PRESENCE, ABSENCE AND QUALITY OF MOLDED PARTS THEREIN; non-provisional patent application Ser. No. 09/738,602, filed Dec. 16, 2000, issued into U.S. Pat. No. 6,592,355 on Jul. 15, 2003, entitled PART-FORMING MACHINE HAVING AN IN-MOLD INTEGRATED VISION SYSTEM AND METHOD THEREFOR; non-provisional patent application Ser. No. 10/293,846, filed Nov. 13, 2002, issued into U.S. Pat. No. 6,699,413 on Mar. 2, 2004, entitled PART-FORMING MACHINE HAVING AN IN-MOLD INTEGRATED VISION SYSTEM AND METHOD THEREFOR; and pending non-provisional patent application Ser. No. 10/441,338, filed May 20, 2003, entitled PART-FORMING MACHINE HAVING AN IN-MOLD INTEGRATED VISION SYSTEM AND METHOD THEREFOR; wherein the present application claims benefit to all of the above-listed applications to the fullest extent permitted by law.

TECHNICAL FIELD

The present invention relates generally to sensory devices and methods thereof, and more specifically, to a machine sensory system and method for optimizing the cycle time of a part-forming process. The present invention is particularly suitable for, although not limited to, use with an injection molding machine, wherein the temperature status of a molded part is ascertained and utilized to enable minimization of mold close time.

BACKGROUND OF THE INVENTION

The parts forming industry is one of the world's largest industries in both total revenue and employment. As a multi-billion dollar industry, even small improvements to the manufacturing process can prove to have an enormous influence on system efficiency, and thus can create tremendously beneficial financial impact.

Formed parts are generally created via molds, dies and/or by thermal shaping, wherein the use of molds remains the most widely utilized methodology. There are many methods of forming a part via a mold, such as, for exemplary purposes only, stretch-blow molding, extrusion blow molding, vacuum molding, rotary molding and injection molding. Injection molding is one of the most popular methods and, as such, is one exemplary process wherein the implementation of a variety of sensory inspection specifics have been recognized as means to increase efficiency via, for example, decreased task repetition and failure, and improved part quality.

Injection molding systems are typically used for molding plastic and some metal parts by forcing liquid or molten plastic materials or powdered metal in a plastic binder matrix into specially shaped cavities in molds typically having two separable portions, or mold halves, configured to form the desired interior mold cavity or plurality of cavities when the two mold halves are mated or positioned together, wherein the plastic or plastic binder matrix is cooled and cured therein to make a generally solid part or parts. For purposes of convenience, references herein to plastic and plastic injection molds are understood to also apply to powdered metal injection molding and other materials from which shaped parts are made by injection molding, even if they are not mentioned or described specifically.

The mold close portion of the molding process generally has two primary functions, wherein the first segment of the mold close time is essentially devoted to injecting the molten material into the cavity area or areas under pressure until proper compaction and filling is accomplished. The second segment of the mold close time is essentially dedicated to cooling the injected material until a solid phase is obtained. Thus, after liquid or molten plastic is injected into the mold and the interior mold cavity or cavities is filled, the material is allowed to cool or cure to harden into a hard plastic part or several parts, depending on the number of cavities, whereafter the two mold halves are separated to expose the hard plastic part or parts so that the part or parts can be removed from the interior mold cavity or cavities.

In most injection mold production lines, the injection molding machines operate automatically, once the desired mold is installed, in continuous repetitive cycles of closing the mold halves together, heating them, injecting liquid or molten plastic into the mold cavities, cooling to cure or harden the plastic in the mold into hard plastic parts, opening or separating the mold halves, ejecting the molded hard plastic parts, and closing the mold halves together again to mold another part or set of parts. Thus, the nature of the molding process dictates that the efficiency and optimization of system operational parameters and/or part formation is critical to high-throughput requirements.

Some prior system improvements have focused on optimization of injection pressures, whereby very high pressures facilitate injection of the liquid or molten plastic into the mold cavities to completely fill all portions of the cavities in a timely manner. Other improvements have focused on reducing the incidence of unnecessary repetitious tasks, namely, the number of strokes of the ejector apparatus necessary to dislodge a formed part from a mold. For example, through the use of machine sensory systems, the time previously required for pre-set multiple ejector cycling can be substantially eliminated and wear and tear on the ejector equipment and molds can be reduced. Technologies, such as light beam sensors, vision systems, air pressure sensors, infrared sensors, vacuum sensors, and others, have been employed to assess the open mold halves for computerized comparison to reference data relating to empty mold halves stored in memory to detect any unremoved plastic parts or residual plastic material in the mold halves. In each instance, a variety of sensory data is acquired from a target site and is analyzed by a computer according to a comparative or otherwise objective specification in order to determine the presence or absence of a part within the mold. The analysis results are reported to a controller, whereby decisions relating to the ejector system are influenced and/or directed as a result thereof.

In extremely time sensitive automatic cycling systems such as injection molding machines, even slight delays can affect the overall efficiency of the system and result in substantial increase in the cost of goods. Because each such improvement, over the course of days, weeks, and months of injection molding parts in repetitive, high volume production line operations, can significantly bear on production quantity and cost factors, it remains desirable to identify any potential avenues that may lead to an advantageous reduction in cycle time.

Presently, the length of the mold close portion of the molding processing cycle is typically accomplished through trial and error of the process cycle, sometimes following rough approximations based upon mold parameters. No effective system is available or suggested for determination of specifically optimized mold close time parameters. Because the mold close portion can represent 80% of the cycle time, for example, eight (8) seconds of a total molding process time of ten (10) seconds, a time savings of even one (1) second during the mold close portion could result in a 10% increase in production volume on a single machine.

Therefore, it is readily apparent that there is a need for a sensory system and method that can decrease complete cycle time and improve efficiency by effectively reducing the mold close portion of the molding processing cycle, thereby increasing productivity and avoiding the above-discussed disadvantages.

BRIEF SUMMARY OF THE INVENTION

Briefly described, in a preferred embodiment, the present invention overcomes the above-mentioned disadvantages and meets the recognized need for such a device by providing a sensory system and method for optimizing the cycle time of a part-forming process, wherein the temperature status of a molded part is ascertained and utilized to enable minimization of mold close time.

More specifically, the present invention is a sensory device and method for optimizing mold close time parameters, whereby reliance on trial and error of the process cycle can be substantially eliminated through the use of direct measurement of the temperature of the outside of the molded part after opening of the mold, wherein by using an infrared sensing device that converts thermal radiation into temperature values via radiometric algorithms, the temperature measurement of the outside of the molded part offers a basis, via empirical measurements, to determine the difference between the temperature of the center of the part and the temperature of the outside surface of the part when the mold is open. Such calculation results can be further utilized to determine if cooling of the part has taken more cycle time than necessary, or if the part needs more time to cool, thus enabling adaptive feedback to optimize the injection molding press cycle time.

Thus, a feature and advantage of the present invention is the ability of such a sensory system and method to enable optimization of cycle time by minimizing mold close time.

Another feature and advantage of the present invention is the ability of such a sensory system and method to facilitate diagnostic determination of the temperature of the center of a molded part following opening of the mold, thereby enabling system adjustment in response thereto.

Another feature and advantage of the present invention is the ability of such a sensory system and method to maximize throughput and quality realized from a machine.

Another feature and advantage of the present invention is the ability of such a sensory system and method to be incorporated with a part-forming machine to facilitate minimization of closed mold cooling time via defined parameter assessment and adaptive feedback control.

Another feature and advantage of the present invention is the ability of such a sensory system and method to incorporate infrared assessment capabilities to capture thermographic images of a molded part, to utilize the data to determine the most favorable mold close time parameters and to enable process adjustment in response thereto.

Another feature and advantage of the present invention is the ability of such a sensory system and method to facilitate incorporation of sensors within a part-forming machine mold, thereby increasing the available data input window by allowing images to be acquired during the mold-opening process.

Another feature and advantage of the present invention is the ability of such a sensory system and method to minimize, and thereby optimize, mold closed part cooling time without necessitating adjusting coolant flow rates or molding shots.

Another feature and advantage of the present invention is the ability of such a sensory system and method to shorten cycle time and improve productivity without necessitating adjusting ejection parameters.

Another feature and advantage of the present invention is the ability of such a sensory system and method to enable determination of the minimal length of mold closure time necessary for the center of a part to reach the glass transition temperature, wherein such an essentially specific determination can be made for any system and/or molten material combination.

Another feature and advantage of the present invention is the ability of such a sensory system and method to enable integration of the sensory processing with the machine controllers.

Another feature and advantage of the present invention is the ability of such a sensory system and method to provide a novel quality control inspection station, wherein the calculated assessment of the core temperature of the molded part following opening of the mold enables detection of inadequate mold closure time, wherein reactionary steps can be implemented in order to prevent continued cycles of improperly/incompletely formed parts.

These and other objects, features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATE EMBODIMENTS

In describing the preferred and alternate embodiments of the present invention, as illustrated in the figures and/or described herein, specific terminology is employed for the sake of clarity. The invention, however, is not intended to be limited to the specific terminology so selected; and it is to be understood that each specific element includes all technical equivalents that operate in a similar manner to accomplish similar functions.

With regard to all such embodiments as may be herein described and contemplated, it will be appreciated that optional features, including, but not limited to, aesthetically pleasing coloration and surface design, and labeling and brand marking, may be provided in association with the present invention, all without departing from the scope of the invention.

To better understand the present system and method of this invention, it will be specifically explained in the context of a particular machine system, that is, its preferred use in conjunction with an injection molding system. However, it is expressly understand and contemplated that the sensory system and method described herein is suitable for utilization in combination with any machine system such as, for exemplary purposes only, for die cast, extrusion, structural foam, and rapid injection molding (RIM) systems. That is, it is important to understand that the present invention will also work just as well with any of the part forming systems or techniques mentioned above as well as many others, therefore, while the system and method of the present invention is described conveniently with the typical, conventional injection molding apparatus described herein, it is not limited to application or implementation with only such conventional apparatus.

Figure 1:
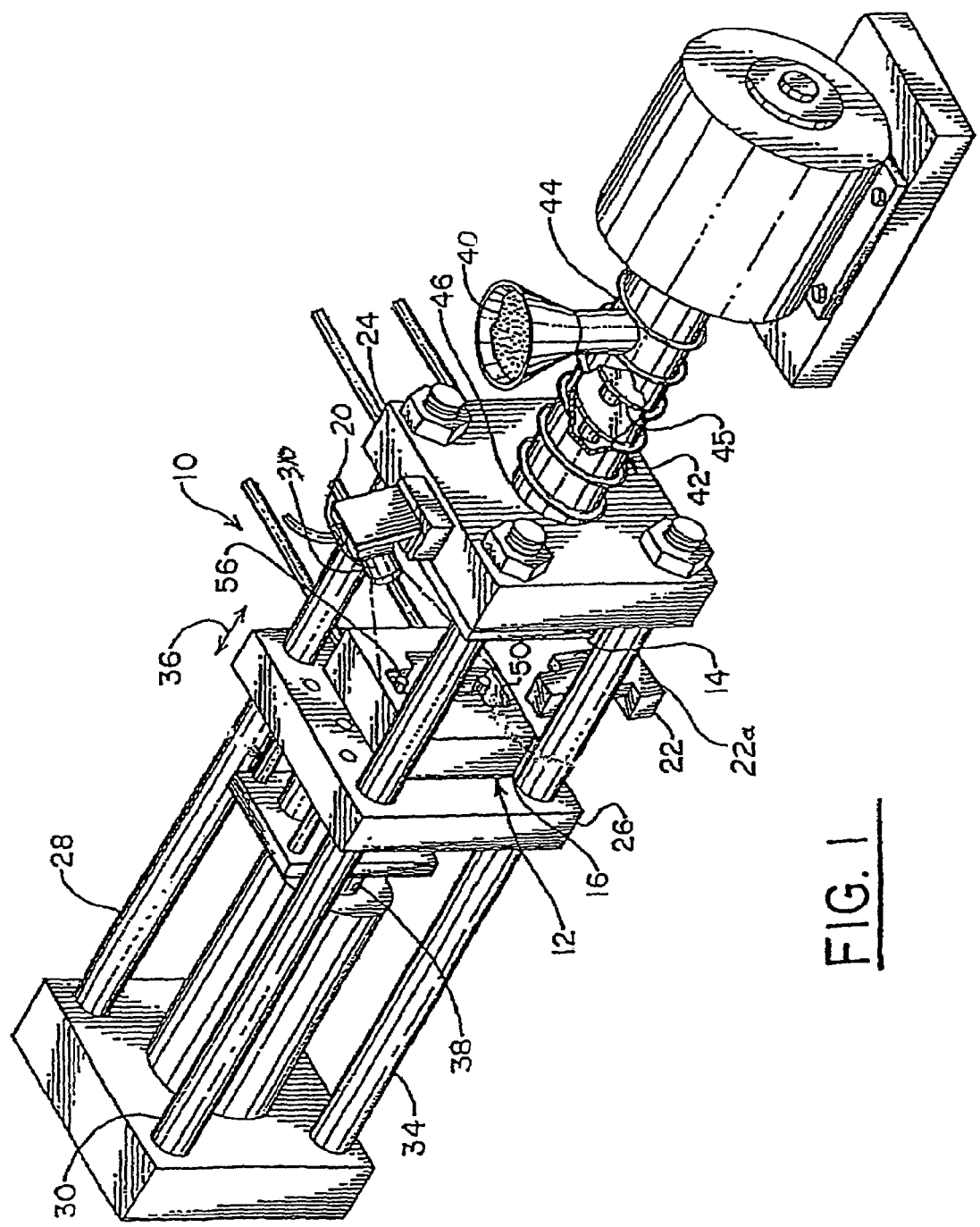
FIG. 1 is a perspective view of a typical injection molding machine showing a sensor.

With reference to the preferred, exemplary use in combination with an injection molding machine and the process thereof, referring first to FIG. 1, conventional automated injection molding machine 10 is shown equipped with mold 12 comprising two mold halves 14, 16, sliding rod-type ejector system 18, and preferably sensor 20 for acquiring sensory data 23 (not shown) from a molded part within the open mold half 14.

Preferably, sensor 20 is infrared (IR) sensing device 310 for acquiring thermographic images; however, any suitable sensor or camera may be utilized. Preferably, sensory data 23 is in electronic format that can be stored in memory, and/or preferably analyzed and/or processed to determine the temperature of the outer portion of the plastic part in the mold half 14, wherein the temperature determination is preferably accomplished via the use of radiometric algorithms available in the art to convert thermal radiation data into temperature values.

Figure 2:
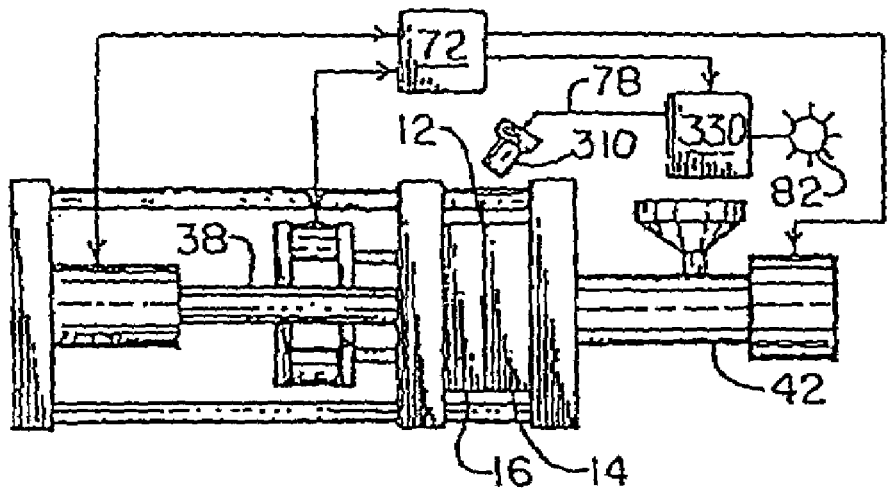
FIG. 2 is a partial side elevation view of a typical injection molding machine showing a sensor and showing the mold closed.

In general, the exemplary conventional injection molding machine 10 comprises two platens 24, 26 mounted on a frame made of four elongated frame rods 28, 30, 32 (not shown), 34 for mounting the two halves 14, 16 of mold 12. Stationary platen 24 is immovably attached to rods 28, 30, 32, 34, while moveable platen 26 is slidably mounted on rods 28, 30, 32, 34 so that it can be moved back and forth, as indicated by arrow 36, in relation to stationary platen 24. Therefore, mold half 16 mounted on moveable platen 26 is also moveable as indicated by arrow 36 in relation to the other mold half 14 that is mounted on stationary platen 24. A large hydraulic or mechanical ram 38, which is capable of exerting a substantial axial force, is connected to moveable platen 26 for moving mold half 16 into contact with mold half 14 and holding them together very tightly, as depicted in FIG. 2, while liquid or molten material 40 is injected into mold 12. Part forming materials, such as for exemplary purposes only, polymers, metals and/or thermoplastics, are in a molten state, e.g. molten material 40, while cavity 50 is being filled and are typically injected under pressure into part-forming cavity 50. Once cavity 50 is filled, the cooling process begins.

Most molds 12 also include internal ducts 15, 17 (not shown) for circulating heating and cooling fluid, such as hot and cold water, through the respective mold halves 14, 16. Hot fluid is usually circulated through ducts 15, 17 to keep mold 12 hot during the injection of liquid or molten material 40 into cavity 50. Then, cold fluid is circulated through ducts 15, 17 to cool mold 12 to allow the liquid or molten material 40 to solidify into hard molded part 22. Once the center 22b (not shown) of molded part 22 reaches, or essentially passes below the relevant glass transition temperature, $T_g$, the melted crystalline strands of molten material 40 realign to an elastic, or more amorphous state, mold 12 can be opened and part 22 ejected.

A typical plastic injector or extrusion system 42 may comprise an injector tube 44 with an auger 45 in tube 44 for forcing the liquid or molten material 40 through aperture 46 in stationary platen 24 and through duct 48 (not shown) in mold half 14 into mold cavity 50 that is machined or otherwise formed in mold half 16. In many applications, there are more cavities than one in mold 12 for producing a plurality of parts per molding cycle. In such multiple cavity molds, multiple ejectors may be required to eject the hard molded parts from all of the cavities. Typically, after the liquid or molten material 40 is injected into mold 12 to fill mold cavity 50 and after the material 40 in mold cavity 50 has solidified, ram 38 is actuated to pull mold half 16 away from the mold half 14 so that hard molded part 22 can be ejected from mold cavity 50.

Thus, the general phases involved in an exemplary injection molding cycle include (1) mold closure, (2) mold filling and packing, (3) mold/part cooling, (4) mold opening, and (5) part ejection, wherein three of the five phases occur while the mold is closed, and wherein the most lengthy phase is the mold/part cooling phase, contributing to up to 80% of the entire cycle time. The sensory system and method of the present invention preferably alleviates the trial and error selection/determination of the cycle time of the molding press by measuring the temperature of the molded part, preferably using infrared sensing device 310 and converting thermal radiation into temperature values using radiometric algorithms, and enabling optimization of the molding press cycle time, or part cooling phase.

Figure 3:
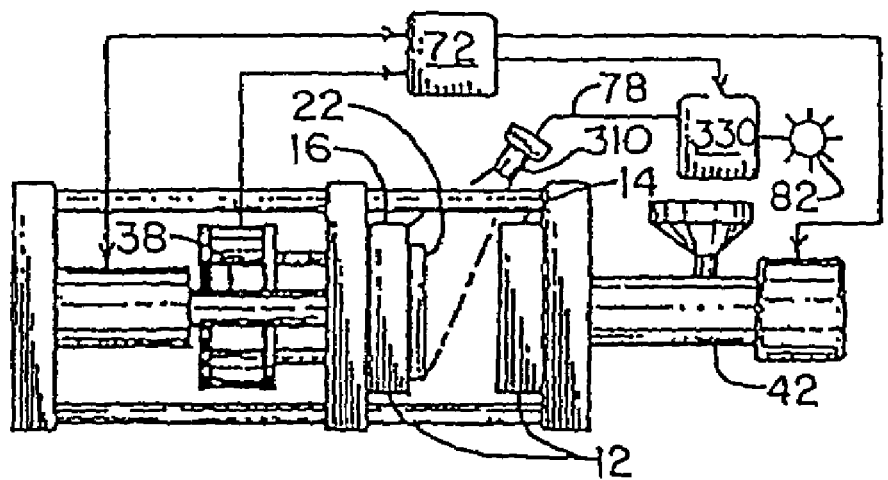
FIG. 3 is a partial side elevation view of the injection molding machine of FIG. 2 showing the mold opened.
Figure 4:
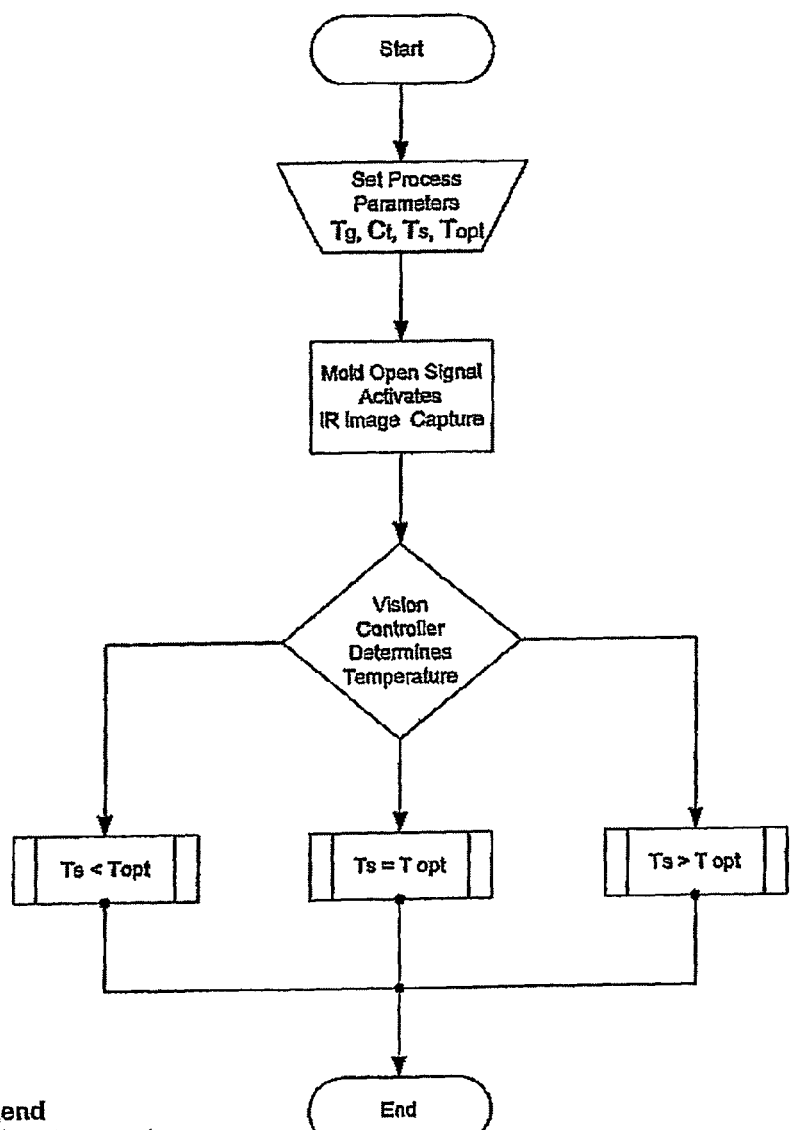
FIG. 4 is a functional diagram of a sensory system and method according to the preferred embodiment of the present invention.

In the preferred embodiment, after mold halves 14, 16 separate, as depicted in FIG. 3, machine controller 72 sends a signal to sensor 20 to acquire thermographic data regarding part 22. That is, essentially following opening of mold 12, infrared sensing device 310 analyzes the thermographic characteristics of the molded part 22 therein, wherein the thermographic characteristics generally relate to the outer surface 22a of the molded part 22. Although it is preferred that sensor 20 acquire the data when mold 12 is open, it is contemplated herein that data regarding part 22 could be acquired essentially immediately upon opening of mold 12, prior to mold 12 being fully open, wherein sensor 20 could be alternately configured to enable such performance. The resulting thermographic data is transmitted via a wired or wireless system, such as, for exemplary purposes only, spread-spectrum radio frequency, infrared signal communication platforms, or any other suitable transmission system to analyzing means 340 (not shown), preferably a host computer, wherein analyzing means 340 utilizes radiometric algorithms to convert the data into temperature reading, $T_s$, or the temperature of the outside 22a of part 22. It is also anticipated that analyzing means 340 could be integrated with, or a sub-component of, sensor 20, wherein sensor 20 could be an "intelligent" sensor with on-board analysis capabilities and the ability to communicate analytical results to part-forming machine controller 72.

Although the preferred embodiment contemplates wireless components, integrated controller 100 (not shown) can also be a personal computer having serial, parallel and or USB ports for connecting data inputs. Known machine controller 72 programs are loaded into integrated controller 100. One or more sensory devices 20 are connected directly to one or more preexisting serial, parallel or USB ports of the integrated controller 100. It should also be noted that data cards specific for the respective sensor 20 and having an interface port therein can be connected directly to the bus of the CPU of the computer to provide a connection means for the sensor 20. By programming integrated controller 100 or loading known software therein, integrated controller 100 can receive the input signal(s)/data from sensory devices 20, analyze the data, provide an output signal to sensory devices 20 and communicate directly and contemporaneously with the preexisting machine controller 72 software. The above-described processes performed by the sensor controller 70 and the machine controller 72 can all now be performed by the integrated controller 100. It should be noted that one skilled in the art with knowledge of the parameters and the desired result can program integrated controller 100 to analyze data and provide the appropriate signals to control part-forming machine 10.

It is preferred that machine controller 72 is wirelessly enabled for the transmission/reception of input/output data. Like the sensory data 23, the I/O data may be communicated via any type of wireless transmission, such as, for exemplary purposes only, spread-spectrum radio frequency or infrared signal communication platforms. It is also anticipated that, in order to accommodate individual application preferences, the present invention could be utilized with only sensory data 23 transfer occurring via a wireless format, or, alternatively, with only I/O data transfer occurring via a wireless format, wherein the other data component could incorporate a traditional hard-wire transfer system.

Because it is necessary for the center 22b of molded part 22 to reach, and essentially pass, the relevant glass transition temperature, $T_g$, before mold 12 can be opened and part 22 ejected, because $T_g$ is different for each polymer, and because direct measurement of the temperature of the center 22b is unable to be accomplished, empirical measurements of the difference between the temperature of the surface, or outside 22a, $T_s$, and the temperature of the center 22b, $T_c$, can be approximated and utilized within further calculations to ascertain whether the cooling phase has been allotted more cycle time than necessary, or whether molding press cycle time needs to be increased.

In the preferred form of the present invention, the optimum temperature, $T_{OPT}$, is defined as the target temperature for the outside 22a of part 22 essentially immediately upon opening of mold 12 when the cooling time, $t_c$, is fully optimized. That is, if $t_c$ is too short, part 22 will not be ready for ejection when mold 12 is opened, and, conversely, if $t_c$ is too long, part 22 will have remained in mold 12 longer than necessary. Thus, defining and realizing $T_{OPT}$, according to the present invention, enables increased quality control via assurance of adequate cooling and increased machine throughput via elimination of unnecessary "in mold" time of ejection-ready parts. $T_{OPT}$ is preferably calculated for each molding material/system via the representative equation:

$$T_g - \Delta T_{(C-S)} - T_{FOS} = T_{OPT}$$

Because it is desired that the temperature of the center 22a of part 22, $T_C$, reach the glass transition temperature, $T_g$, for the molding material in order to proceed with ejection; because sensor 20 enables measurement of the temperature of the outside 22b, or surface, of part 22, $T_s$; and because there is an empirically determined difference between $T_C$ and $T_S$; in order to determine $T_{OPT}$, glass transition temperature, $T_g$, is preferably reduced by the difference between $T_C$ and $T_S$, or $\Delta T_{(C-S)}$. Additionally, in recognition of tolerance constraints to enable some allowable variance in processes, $T_g$ is also preferably reduced by a factor of safety (FOS), $T_{FOS}$.

In the preferred embodiment of the sensory system and method of the present invention, sensor 20 enables measurement of $T_S$ preferably as soon as mold 12 achieves an open position, wherein $T_S$ is compared to $T_{OPT}$, preferably via analyzing means 340. If $T_S$ is less than $T_{OPT}$, analyzing means 340 preferably sends a data signal to the machine controller 72 to decrease the mold close phase, or cooling time, $t_c$, preferably before the start of a new molding cycle, thereby increasing throughput. On the other hand, if $T_S$ is greater than $T_{OPT}$, analyzing means 340 preferably sends a data signal to the machine controller 72 to increase the mold close phase, or cooling time, $t_c$, preferably before the start of a new molding cycle, thereby assuring quality part production. Although generally automated control is preferred, it is anticipated within the scope of the present invention that analyzing means 340 could send a signal to an operator, whereby appropriate semi-automated and/or manual cycle adjustment could be performed. Additionally, analyzing means 340 is preferably integrated with machine controller 72; wherein the analyzing means 340 is preferably a remotely positioned, wirelessly linked computer or microprocessor. However, a separate controller/computer may be utilized that is that is communicationally linked with machine controller 72.

By checking the part temperature after every cycle, or at a frequency otherwise desirable, it is expected that the optimum minimization of the mold-closed cooling time will rarely be exceeded, thus enabling increased production via reduced cycle time. In production lines where injection molding machine 10 is automatically cycled to continue producing parts for weeks and months on end, the saved time can be significant and can allow each injection molding machine 10 to produce many additional parts in a year. For example, if the complete cycle time is 10 seconds, a one (1) second improvement in the cooling phase can result in a direct 10% increase in production volume.

Figure 5:
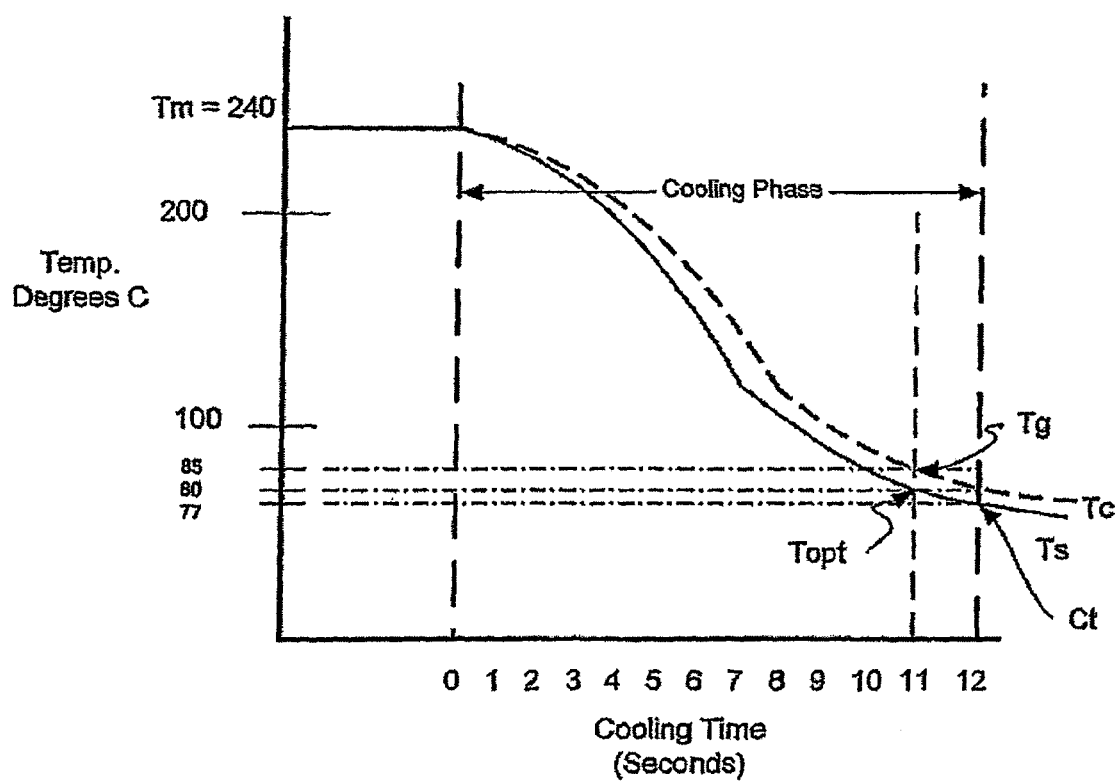
FIG. 5 is a graphical representation of the relationship of temperature and time with respect to a cooling part.

Referring now to FIG. 5, a graphical representation of an example scenario, such as ABS, wherein $T_g$ is 85° C. and $T_m$ (melting temperature) is 240° C. Sensor 20 determines the measurement of $T_S$ at 77° C. Analyzing means 340 has information from the equation:

$$T_g - \Delta T_{(C-S)} - T_{FOS} = T_{OPT}$$

to calculate $T_{OPT}$, wherein $T_g$=85° C., $\Delta T_{(C-S)}$=3° C., and $T_{FOS}$=2° C., arriving at a value for $T_{OPT}$=80° C. Preferably, analyzing means 340 compares $T_{OPT}$ to $T_S$. Because $T_S$ is 3° C. lower than $T_{OPT}$, the amount of time expended to enable the part 22 to cool from 80° C. to 77° C. is unnecessary. Thus, analyzing means 340 can send a data signal to machine controller 72 to shorten the mold close/part cooling phase by one second.

In an alternate embodiment, an ultrasonic sensor could be utilized, wherein the density of part 22 could be assessed by sensor 20 and the resulting data could be utilized to ascertain the cooling status of the part 22 and the necessary length of the mold close/part cooling phase.

In another alternate embodiment, differential scanning calorimetry could be utilized to conduct a thermal analysis of part 22, wherein thermal reactions occurring in the plastic, such as glass transition, could be reported as energetic peaks and could be utilized to determine minimal cooling time parameters.

In another alternate embodiment, thermal mechanical analysis could be utilized to directly measure motion in the heated plastic part, noting the change of motion when the polymer goes from a crystalline to a more amorphous state at glass transition, and utilizing the resulting data to determine minimal cooling time parameters.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A method of inspecting the status of a molded part, comprising the steps of:
    a. acquiring an infrared thermograph of the part before the part exits the mold;
    b. utilizing said infrared thermograph to report the temperature of the outside of the part;
    c. transferring said temperature data to an analyzer;
    c. analyzing said temperature data; and
    d. sending a signal to a controller, wherein said controller is responsive to said signal from said analyzer, wherein said analysis of said temperature data further comprises an empirical measurement of a difference between a part surface temperature $T_S$ and a part center temperature $T_C$ in view of a glass transition temperature $T_g$ in order to determine an optimum temperature $T_{OPT}$ with an optimized cooling time $t_c$.

2. The method of claim 1, wherein said infrared thermograph is acquired during a mold status selected from the group consisting of: immediately upon mold opening, prior to mold being fully open, and mold fully open.

3. The method of claim 1, wherein said temperature data is transferred to said analyzer by a method selected from the group consisting of spread-spectrum radio frequency, and infrared signal communication platform.

4. The method of claim 1, wherein $T_{OPT}$ is determined according to the equation:

$$T_g - \Delta T_{(C-S)} - T_{FOS} = T_{OPT}$$

wherein $T_{FOS}$ is a factor of safety.

5. The method of claim 4, wherein said infrared thermograph of said part provides $T_S$, wherein said analyzer compares $T_S$ is compared to $T_{OPT}$, wherein if $T_S$ is less than $T_{OPT}$, said signal from said analyzer directs said controller to decrease the mold close phase by decreasing cooling time $t_c$, and wherein if $T_S$ is greater than $T_{OPT}$, said signal from said analyzer directs said controller to increase the mold close phase by increasing cooling time, $t_c$.

6. The method of claim 1, wherein said method is repeated for every part-forming cycle.

\* \* \* \* \*